Oct. 12, 1948.  W. J. O'BRIEN  2,450,982
DYNAMOELECTRIC MACHINE
Filed July 22, 1942
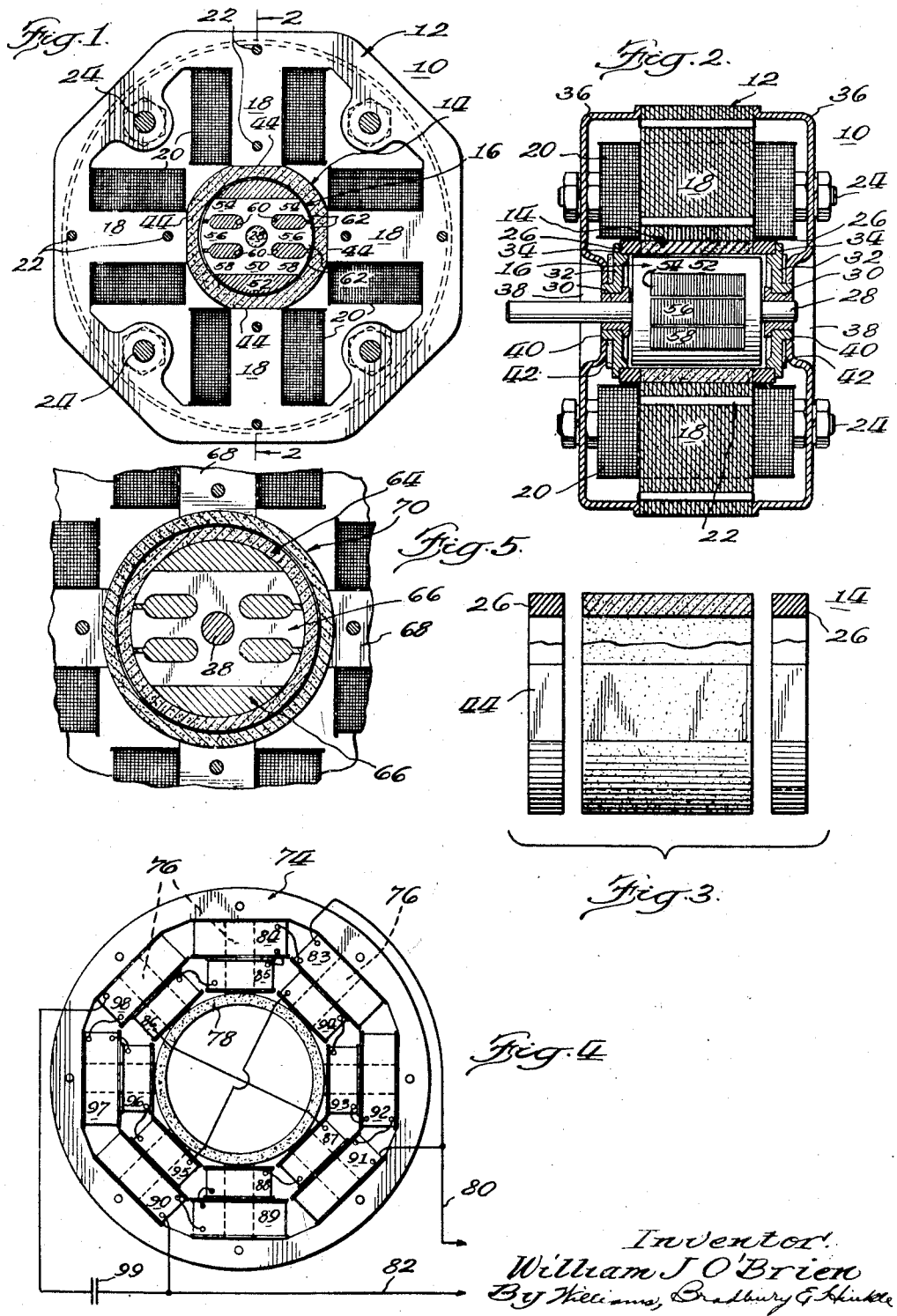
Inventor:
William J. O'Brien
By Williams, Bradbury & Hinkle
Attys.

Patented Oct. 12, 1948

2,450,982

UNITED STATES PATENT OFFICE 2,450,982

DYNAMOELECTRIC MACHINE

William J. O'Brien, Chicago, Ill., assignor to Edward F. Andrews, Chicago, Ill.

Application July 22, 1942, Serial No. 451,865

12 Claims. (Cl. 172—120)

The present invention relates to dynamo-electric machines and has for its primary object the provision of new and improved dynamo-electric machines, particularly motors, which may be constructed readily and economically and which have improved efficiency and operating characteristics.

Considerable effort has been expended in improving small electric motors and yet, in spite of this, motors of this type in some cases are comparatively expensive; in other cases have but low starting torque; and are all comparatively inefficient.

One of the primary objects of the present invention is the provision of a new and improved dynamo-electric machine of the alternating current type wherein means are provided for obtaining a rotating field of more uniform intensity.

Another object of the present invention is to provide a new and improved dynamo-electric machine of the alternating current type wherein a rotating field of more uniform intensity is obtained by placing between the rotor and stator a flux distributing member having permeability substantially greater than that of air and substantially less than that of homogeneous soft iron and also having a high magnetic saturation point.

Another of the objects of this invention is to provide a new and improved alternating current dynamo-electric machine having a flux distributing member located between the stator and rotor having a permeability substantially lower than that of the stator frame, a low electrical conductivity, and a high magnetic saturation point.

A further and more specific object of this invention is to provide a new and improved alternating current dynamo-electric machine having a flux distributing member located between the stator and rotor composed of iron particles or pieces bonded together with a suitable binder.

Another more specific object of the invention is to provide a flux distributing member of the character aforesaid comprising powdered iron bonded with a thermo-setting plastic material.

Another of the major objects of the present invention is to provide a new and improved dynamo-electric machine which may be constructed both readily and economically. To attain this object, the stator is constructed of laminations punched with inwardly extending coil cores, prewound coils are slipped over the cores, and then a generally tubular member is inserted into the stator and preferably fixedly held in place by the innermost ends of the cores.

A further object of the invention is the provision of a new and improved dynamo-electric machine wherein the generally tubular member is utilized to provide an improved flux distribution.

Another object of the present invention is to provide a new and improved motor wherein the rotor is rotatably mounted in the previously referred to tubular member and the two constitute a structural unit which can be readily inserted in and secured to, or removed from, the stator without disassembling the unit. A machine constructed in this manner can be made and assembled readily and economically and the rotor unit can be removed from the stator without disturbing the bearing alignment. It is preferred that the rotor be journaled in bearings supported by end pieces having outer surfaces fitting into the interior bore of the tubular member so that the rotor can be readily aligned concentrically within the bore. This construction also has the advantage that the rotor clearance can be made small without requiring special alignment procedure.

Another object of the present invention resides in the provision of a combined flux distributing and rotor supporting member having the electrical and structural advantages set forth above whereby dynamo-electric machines, and particularly small motors of good efficiency and operating characteristics, may be constructed and assembled both readily and economically.

Another object of the present invention is the provision of a combined flux distributing and rotor supporting member composed of powdered iron bound by a binder of thermo-setting plastic material and having end portions of plastic material to form a structural unit of high strength capable of supporting the rotor and effecting flux distribution with a minimum of eddy current losses and magnetic leakage.

Another object of the present invention is the provision of a new and improved alternating current dynamo-electric machine, particularly a motor, wherein improved flux distribution is provided conjointly by a flux distributing ring located between the stator and rotor and by distributing each winding over three adjacent stator coil cores in such a manner that the center core has a greater excitation than the cores on each side thereof.

A further object of the present invention is in the provision of a new and improved alternating current dynamo-electric machine of the character set forth in the preceding paragraph, wherein the machine is constructed and arranged in such a manner that the coils may be prewound and individually and readily mounted on their respective cores.

Further objects and advantages of the invention may become apparent from the following description, in the course of which reference is had to the accompanying drawing, in which:

Fig. 1 is a transverse cross-sectional view of a self-starting synchronous motor constructed in accordance with the invention. This motor may be operated as a two-phase or split phase motor;

Fig. 2 is an axial cross-sectional view of the motor;

Fig. 3 is an enlarged exploded view, partly broken away, of the flux distributing and rotor supporting member utilized in the motor of Figs. 1 and 2 and illustrating the component parts of the member prior to their being finally united to form an integral unit;

Fig. 4 is a view similar to Fig. 1 (with the rotor omitted) of a modified form of motor wherein flux distribution is improved by the conjoint action of a flux distributing member and distributed windings;

Fig. 5 is an enlarged fragmentary view similar to Fig. 1 of another embodiment of the invention wherein two flux distributing members are utilized, one of the members being secured to the stator as with the motor of Figs. 1 and 4, and the other surrounding and supported by the rotor.

The dynamo-electric machine 10 embodying the invention illustrated in Figs. 1 and 2, to which reference will first be had, is an alternating current motor of the self-starting, two-phase or split-phase synchronous type. The main structural elements thereof include a stator 12, a generally tubular flux distributing and rotor supporting member 14 fixedly secured to the stator, and a rotor 16 journaled for rotation in the member 14. These elements are of novel construction, both mechanically and electrically, and provide a motor which can be constructed readily and economically and having improved efficiency and operating characteristics.

In accordance with one aspect of the present invention, the stator 12 is constructed with radially and inwardly extending coil cores 18. The inner ends of the cores are spaced apart to define a central aperture and the total arcuate extent of the ends is less than 180°, i. e., the arcuate length of each core end is less than that of the gap between adjacent cores. Each core is surrounded by a coil 20, the coils being individually prewound and preformed with outside dimensions and central openings of a size enabling the coils successively to be placed in the central stator aperture and then slid onto their respective cores. After all the coils have been positioned on the stator, the tubular member 14 is inserted in place, thus retaining the coils on the cores. The stator is preferably made from a number of single-stamped punchings or laminations secured together in suitable manner as by spaced apart pins 22 and bolts 24 extending therethrough.

The construction of the stator in the manner described is particularly advantageous in the manufacture of small synchronous or non-synchronous motors of the split-phase or multi-phase type. The construction may also be employed in the manufacture of direct current motors and both direct and alternating current generators.

The motor 10 may be operated either as a split-phase or two-phase motor. If operated as a two-phase motor, one pair of opposite coils 20 are connected in series across one of the phases and the other pair of opposite coils 20 are connected across the other phase of a two-phase source of alternating current. If operated as a split-phase motor from a single-phase source of alternating current, one pair of coils is connected directly across the source and the other pair is connected across the source in series with a capacitor. When connected in this manner, the coils in series with the capacitor should have a greater number of turns than the other pair of coils. If desired, the two pairs of coils can be connected in series across the source of current with a capacitor in shunt with one of the pairs of coils. When connected in this manner, the pair of coils shunted by the capacitor should have a lesser number of turns than the other pair.

The flux distributing member 14 located between the stator and rotor forms one of the important features of the present invention in that it provides a rotating field of more uniform intensity. The member comprises powdered iron, the pieces or particles of which are electrically insulated from each other. The powdered iron particles are bonded together and formed into desired shape (in this case generally tubular) by mixing them with a thermo-setting plastic material, which mixture is then molded under high pressure and heat. The iron particles have a high magnetic saturation point (i. e., they carry a large number of lines of flux per unit of area before they become saturated) but the permeability of the ring as a whole is very much lower than the permeability of the individual particles owing to the separation of the particles by the bonding material which has a permeability substantially that of air and which provides gaps between the particles of higher permeability. It is desirable that the particles of powdered iron be electrically insulated from each other in order to reduce the eddy currents to a minimum and it is also desirable that the particles of iron have a low hysteresis loss to minimize this loss.

Excellent results have been obtained with the flux distributing member constructed of powdered iron plastic bonded core material obtainable from the Stackpole Carbon Co. as grade S49. Excellent results have also been obtained with a similar material obtainable from the Aladdin Radio Industries, Inc., as "520."

The material obtained from the first-named concern has a permeability of around 40, while that obtained from the second-named concern has a permeability of around 30. The permeability of the flux distributing member may, however, be varied to meet differing requirements of motors of varying characteristics.

A flux distributing member such as that illustrated in Figs. 1 and 2 is of particular advantage in small motors by reason of the more uniform intensity rotating field obtained therewith even when the stator windings are not distributed. Referring now to Fig. 1, it may be noted that the motor illustrated therein has four inwardly projecting coil cores that are spaced 90° apart and each of which is surrounded by an individual coil. Since opposite coils are connected in series, the coils form two windings that are located at right angles to each other. These windings are supplied with alternating currents that are displaced 90° from each other to produce a rotating field. The rotating field produced by these windings would not, however, be of uniform intensity if the flux distributing member was omitted, because there would be sharp changes in flux as a pole of the rotating field passes from underneath or approaches a coil core.

In order to provide a more uniform intensity rotating field, there is provided an annular region of fairly uniform magnetic permeability completely surrounding the rotor in the space between the rotor surface and the inner ends of the pole cores. This region comprises material having a permeability substantially lower than that of the material of the coil cores, so that saturation will not occur under any normal energization of the stator windings, but having also a permeability very substantially greater than that of air so that, although the air gap is small, the flux passing from the coil cores to the rotor is properly distributed. The annular region provides a flux distribution such as to minimize the abrupt changes in the intensity of the rotating field as the pole of the field passes from underneath or approaches a coil core. The annular region provides a sinusoidal distribution of the flux, as distinguished from the more or less concentrated distribution obtained from the cores, and this sinusoidal distribution produces a rotating field of more uniform intensity.

During the operation of the motor, the flux carried by the member 14 is continually changing in such a way as to produce the rotating field. The flux through the member 14 changes with varying energization of the coils and also with load changes. Due to the fact that the member 14 possesses a high saturation point and a permeability such that it does not become saturated when the energization is high and does not bypass too much flux through the member when the energization is low, an improved flux distribution is maintained under all normal conditions of operation. This condition is arrived at by giving a low enough permeability relative to the permeability of the coil cores or relative to the maximum normal excitation of the coils so that the excitation producing saturation in the member 14 is never reached or at least never substantially exceeded. In other words, the member by-passes an amount of flux which varies with the varying energization throughout the normal range. At high excitation, the flux by-passed by the member is higher, and at lower energizations, the flux is lower. Thus use of the flux distributing member of the present invention produces a more uniform rotating field, increases the efficiency of the motor, and improves the operating characteristics.

The bonded powdered iron utilized in the construction of the distributing member is especially well suited for this purpose. A substantial reluctance is provided by the gaps between the particles of the member while the high magnetic saturation point of the individual particles prevents the member from being saturated at the highest excitation to which the windings are intended to be subjected. The frame of the motor may also be proportioned to become saturated before the flux distributing member is saturated. Thus the flux through the member will increase in a generally linear manner with increasing excitation and it will more effectively distribute the flux under varying conditions of load and excitation.

Inasmuch as the iron particles included in the flux distributing member are also electrically insulated from one another; any eddy currents that may be induced are limited to the individual particles and cannot flow through the ring as a whole.

It may be noted that there is some flux leakage through the flux distributing member which does not contribute to produce power for rotating the rotor, but this is offset by a considerable gain in power and efficiency as a result of the more uniform rotating field obtained by the use of the flux distributing member. A motor utilizing the flux distributing member of the present invention has a high efficiency, high running torque, and high starting torque, and may be built simply and readily and at low cost. The described construction is especially adapted for low cost, small motors.

The above referred to flux leakage through the flux distributing member is actually an advantage when the motor is operated as a capacitor type split-phase motor since the leakage flux provides inductive reactance in the winding connected directly across the line which causes the current in this winding to lag the line voltage, thus the current in the winding in series with the capacitor is required to lead the line voltage by a substantially smaller phase displacement than would be otherwise necessary to produce quadrature between the currents in the two windings.

In accordance with another feature of the present invention, the flux distributing member is provided with end portions 26 made of some suitable non-magnetic material, preferably the same or a similar thermo-setting plastic used as a binder for the powdered iron portion. The powdered iron portion of the tubular member, it should be noted, is of a length substantially equal to the axial length of the stator coil cores. The construction of the flux distributing member is such, therefore, that the end portions and the powdered iron center portion may be preformed separately as indicated in Fig. 3 and then simultaneously subjected to heat and pressure to form an integral unit such as that illustrated in Figs. 1 and 2. This method of constructing the tubular member enables it to be made as a single integral unit with a powdered iron portion of a length substantially equal to the axial length of the coil cores and having insulating end portions for supporting the rotor bearings. When constructed in this manner, the inner bore of the tubular member can be made of uniform diameter throughout and used as a basis for aligning the rotor to insure the concentricity of the latter relative to the bore of the tubular member. Thus no separate aligning operation, as by adjusting the rotor relative to the stator which requires the use of gauges and the like, is required.

The rotor is provided with a shaft 28 extending through and journaled in spaced apart self-lubricating sleeve bearings 30, or other suitable type bearings, mounted as by a press fit in non-magnetic (such as brass) end pieces 32 having peripheral shoulders adapted to fit into the insulating end portions 26 of member 14. As a result, it is a relatively simple matter to assemble the rotor and tubular member as a unit with the rotor accurately aligned and concentric with the bore of the member. The ease with which the alignment can be effected enables the motor inexpensively to be constructed with a relatively small air gap between the rotor and tubular member, thereby to increase the efficiency of the motor.

The motor is enclosed by a pair of end plates 36 of generally cup-like form. These are provided with centrally located inwardly extending apertured recesses 38 closely fitting about central axial portions 40 of the end pieces. The end plates 36 are secured to the stator in such a manner that the rotor is aligned relative to the tubular member and not to the stator. To attain this end, the end plates are secured to the stator by means of the previously referred to bolts 24 which extend through openings in the end plates having diameters somewhat greater than the diameters in the bolts thereby to provide clearance between the two. Soft washers 42 of material (such as felt) are preferably located between the end plates 36 and end pieces 32 so that the end plates clamp and hold the end pieces but do not materially affect the alignment of the bearings relative to member 14.

The member 14 is preferably fixedly secured to the stator by a light press fit. Its exterior surface can be provided, if desired, with a number of flats 44 equal to the number of coil cores so that the member is readily insertable into place yet fixedly held against rotation and easily removable.

While it is preferred that the member 14 be provided with end portions of insulating material, it should be understood that it could be made of powdered iron alone. If this is done, the tubular member may be slotted at the ends and between the coil cores to reduce the flux leakage at the ends.

The rotor 16 constitutes another of the important features of the present invention. It is a rotor of the synchronous type and is constituted of solid iron or, preferably, a number of iron laminations 50 about which is preferably die cast some suitable conducting non-magnetic material 52 such as aluminum. The laminated iron portion 50 is of a novel configuration consisting of three generally parallel and relatively long tooth-defining portions 54, 56, and 58 at diametrically opposite ends thereof. The teeth 54 and 56 and 58 define a pair of generally parallel spaced apart slots 60. In order to increase the torque and efficiency of the rotor, the outer ends of the toothed portions 54, 56, and 58 are provided with oppositely extending lip-like extensions 62 which increase the surface area of the laminated iron portion. The construction of the rotor with deep parallel teeth defining slots enables a greater amount of conducting material to be located between the teeth. The employment of the iron portion of the rotor of somewhat elongated rectangular shape viewed axially provides space for a relatively large amount of aluminum across the long sides bridging between the aluminum at the opposite axial ends of the rotor. It is preferred that the portion of the circumference of the rotor occupied by the aluminum across the straight sides of the iron shall be greater than the portion of the circumference occupied by the iron. Although copper is a good material for the conductive portions of the rotor, aluminum is preferred as it has a lighter weight for a given conductivity and helps to reduce the mass of the rotor, which results in the rotor going into synchronism more readily. While three teeth at each end of the iron portion of the rotor are preferred, some other number of teeth may be employed.

It is preferred, for reasons of expediency in assemblying the motor, that the powdered iron tubular member be secured to the stator. However, it is possible to realize the advantages resulting from the use of the member by dividing it into two parts, one secured to the stator and the other to the outside of the rotor, as illustrated in Fig. 5. In this modification, a powdered iron member 64 is secured directly to the outside of the rotor 66 which corresponds in construction to the previously described rotor 16. The member 64 is preferably of a length equal to the axial length of the coil cores 68 of the motor. A second powdered iron member 70 is secured to the stator coil cores 68, as by a light press fit. The cores 68, it should be noted, have curved inner ends to conform to the outer surface of the tubular member 70.

It is also possible to use simply a flux distributing member secured to the rotor.

In the modification of Fig. 4, improved fluxing distribution is provided conjointly by a flux distributing member located between the stator and rotor and by coils located on three adjacent stator coil cores in such manner that the center core has a greater excitation than the cores on each side thereof. Referring now to Fig. 4, it may be noted that the stator frame 74 includes eight inwardly extending coil cores 76, the inner ends of which are rounded to a radius enabling the flux distributing ring 78 to be inserted into the central aperture defined by the inner ends of the cores after the coils have been assembled in place. The coils of the motor of this embodiment are also of the prewound and preformed type heretofore illustrated but are arranged and connected to provide a degree of flux distribution which, together with the flux distributing member, provide a rotating field of still more uniform intensity. The motor illustrated in the figure now under consideration may be operated as a two-phase or a split-phase capacitor motor. It has, however, been illustrated of the latter type. The stator windings are supplied with energy through conductors 80 and 82. Coils 83 to 90, inclusive, are connected in series directly across conductors 80 and 82, and coils 91 to 98, inclusive, are connected across the same two conductors in series with each other and a condenser 99.

It may, therefore, be noted that each magnetic pole is constituted by three adjacent coil cores 76 and that the center one of each of the three cores constituting a magnetic pole has mounted thereon two coils and that the two adjacent cores have mounted thereon a single coil.

A motor constructed in accordance with this invention may be made easily and economically and full use made of the space between the coil cores for the coils. Furthermore, the coils may be prewound and preformed in order that they may be assembled in place simply by inserting them into the central stator aperture and then sliding them onto the various cores. It will be noted that the coils nearest the outer periphery of the stator have larger outside dimensions than the coils nearest the center of the motor. The reason for this is that otherwise full use could not be made of the intercore space. In assembling the motor, it is preferred that the larger coils first be placed on the coil cores and then the smaller ones in much the same manner as followed in assembly of the previously described motor. Each one of the sixteen coils may have the same number of turns. However, a somewhat better distribution of the flux may be obtained if the coils are wound and arranged so that for each ten turns on the central core of a pole, there are seven turns connected in series therewith on the core to each side of it. This more closely approaches a sinusoidal flux distribution.

A motor constructed in accordance with that illustrated in Fig. 4 thus provides good flux distribution by reason of the flux distributing member 78 and also by distributing a winding over three cores instead of confining it to one.

It should be understood from the foregoing description of a preferred embodiment of the invention and modification of parts threeof that the present invention is susceptible not only of the modifications illustrated and described, but other modifications as well without departing from the essence of the invention.

Having thus described my invention, what I claim as new and desire to secure by Letters Patent of the United States is:

1. In a dynamo-electric machine, the combination including, angularly spaced apart polar members having a high magnetic permeability the inner ends of which are spaced apart to define a central aperture, a rotor in said aperture, continuous flux distributing means located between said rotor and polar members, said means including a pair of continuous rings of magnetic material having a permeability lower than that of said polar members and a high magnetic saturation point, one of said rings being secured to and rotating with said rotor and the other being fixedly secured to and in contact with the polar members.

2. In a dynamo-electric machine having a stator with inwardly extending polar members, the combination including, a stationary generally tubular member located centrally of the polar members, said member comprising an integral molded tubular portion having a central portion of magnetic material bonded with non-conducting material and end portions of non-magnetic material, a rotor, and means supported by the end portions of non-magnetic material for supporting said rotor for rotation within said tubular portion.

3. In a dynamo-electric machine, the combination including a plurality of angularly spaced apart radial polar members, and a generally tubular flux distributing member located adjacent said polar members having a preformed central portion of a length substantially equal to the axial length of the polar members made of powdered iron bonded with a thermo-setting plastic, there being substantially the same distribution of powdered iron opposite and between said polar members and preformed end portions extending axially beyond the polar members made of a thermo-setting plastic and bonded to said central portion.

4. In a dynamo-electric machine, the combination including, a stator having inwardly extending spaced apart radial polar members defining a central aperture, prewound coils having openings whereby they can be placed on the polar members by sliding them over the members from the central aperture, a generally tubular member insertable into said central aperture and adapted to be supported by the inner ends of said polar members forming a stator face, said tubular member having a central portion of length substantially equal to the axial length of said polar members made of magnetic particles bonded together with non-conducting material and end portions made of non-conducting material, non-magnetic end pieces secured to said end portions, and a rotor journaled in said end pieces for rotation within said tubular member.

5. In a dynamo-electric machine having a stator with inwardly extending polar members, the combination including, a stationary generally tubular member located centrally of and supported by the inner ends of the polar members, a rotor, end pieces secured to said tubular member supporting said rotor for rotation within said tubular member, end plates for enclosing the machine, said end plates being apertured centrally closely to fit about portions of said end pieces, and means for securing said end plates to said stator in positions determined by said end pieces.

6. In a synchronous motor, the combination including, a stator having inwardly extending spaced apart radial coil cores, prewound coils having openings whereby they can be placed on the cores by sliding them onto the cores from the central part of the stator, a generally tubular member of magnetic material insertable centrally of and adapted to be supported by the inner ends of said poles for retaining said coils on the cores, non-magnetic end pieces secured to said tubular member, and a rotor journaled in said end pieces for rotation within said tubular member, said rotor including radially extending portions of generally rectangular cross section made of iron and having a plurality of generally parallel spaced apart teeth of substantial length at its ends, the outer ends of said teeth having extensions for materially reducing the inter-tooth spaces and increasing the surface area of the teeth, and a portion of non-magnetic material having high conductivity per unit of weight surrounding said first mentioned portion and teeth except for the ends of the teeth, and dimensioned to give said rotor a substantially cylindrical shape.

7. In a synchronous motor, the combination including, a stator having inwardly extending radial coil cores the inner ends of which are spaced apart and define a central aperture, prewound coils having openings whereby they can be placed on the cores by sliding them onto the cores from said central aperture, a generally tubular member insertable into said aperture and removably supported by the inner ends of the cores for retaining the coils on the cores, said member having a central portion of a length substantially equal to the axial length of said cores made of powdered iron bonded with a thermo-setting plastic and end portions of thermo-setting plastic, non-magnetic end pieces secured to said tubular member, and a rotor journaled for rotation within said tubular member, said rotor including diametrically oppositely extending portions of generally rectangular cross section made of iron, each of said portions having a plurality of generally parallel spaced apart teeth of substantial length at its ends, the outer ends of said teeth having extensions for materially reducing the intertooth spaces and increasing the surface area of the teeth, and a portion of aluminum surrounding the iron portion and teeth except for the peripheral surface of the iron portion and dimensioned to give said rotor a substantially cylindrical shape.

8. A dynamo-electric machine having a stator composed of ferromagnetic laminations with inwardly projecting angularly spaced apart tooth members, including in combination, a flux distributing structure carried by and bridging said tooth members having a continuous cylindrical bore and circular surfaces concentric with said bore at each end, said flux distributing structure including ferromagnetic material and having a lower permeability than said laminations, a rotor having a shaft and mounted for rotation within said bore, said rotor having a diameter slightly less than that of said bore, shaft supporting bearing members at each end of said bore engaging said circular surfaces of said distributing structure and located concentrically to said bore by said circular surfaces, concentric bearing surfaces in said bearing members rotatably supporting said shaft member and holding the outer surface of said rotor in close concentric relation to said bore.

9. An alternating current dynamo-electric machine, including in combination, a stator composed of laminated iron having angularly spaced apart inwardly extending tooth members, a rotor, a flux distributing structure having a cylindrical bore and disposed within and supported by said tooth members and surrounding the rotor, said flux distributing structure being composed of iron particles and an insulating particle separating and bonding material, said iron particles and said separating portions of insulating and bonding material being uniformly distributed all around said structure so that said structure has the same uniform composition of iron particles and separating portions opposite each tooth and between each pair of teeth, thereby forming a flux distributing structure constituting the magnetic polar face of said tooth members and having an overall permeability substantially lower than that of the stator laminations, and rotor bearing means supported concentric to said bore solely by said flux distributing structure.

10. In a dynamo-electric machine having a stator with inwardly extending tooth members, the combination including, a structure of magnetic material having arcuate concentric surfaces including an unobstructed central bore, said structure being carried by the tooth members and its bore constituting the magnetic air gap face of said stator, a pair of rotor locating and bearing means concentrically independent of the outside of said stator carried by and located concentrically to said bore solely by said arcuate concentric surfaces of said structure, and a rotor having a diameter slightly less than that of said bore rotatably mounted between said pair of locating and bearing means within and concentric to said bore.

11. In a dynamo-electric machine, as claimed in claim 10, flanges on each of said rotor locating and bearing means engaging the ends of said structure, and retaining means axially retaining said locating and bearing means whereby said means are held against said structure and against outward axial movement by said retaining means.

12. In a dynamo-electric machine, as claimed in claim 10, wherein each of said pair of rotor locating and bearing means comprises structure having an outer peripheral arcuate surface engaging the arcuate surfaces of said central bore.

WILLIAM J. O'BRIEN.

REFERENCES CITED

The following references are of record in the file of this patent:

UNITED STATES PATENTS

| Number | Name | Date |
|---|---|---|
| 433,701 | Tesla | Aug. 5, 1890 |
| 1,735,222 | Thompson | Nov. 12, 1929 |
| 1,770,905 | Barrett | July 22, 1930 |
| 1,823,601 | Hansen et al. | Sept. 15, 1931 |
| 1,895,356 | Warren | Jan. 24, 1933 |
| 1,910,473 | McNeil | May 23, 1933 |
| 1,913,179 | Warren | June 6, 1933 |
| 2,072,894 | Lilja | Mar. 9, 1937 |
| 2,078,805 | Merrill | Apr. 27, 1937 |
| 2,128,544 | Surjaninoff | Aug. 30, 1938 |
| 2,160,076 | Lux | May 30, 1939 |

FOREIGN PATENTS

| Number | Country | Date |
|---|---|---|
| 158,013 | Great Britain | Feb. 3, 1931 |